(12) United States Patent
Puranen et al.

(10) Patent No.: US 8,738,185 B2
(45) Date of Patent: May 27, 2014

(54) ALTITUDE ADJUSTMENT FOR HEATING, VENTILATING AND AIR CONDITIONING SYSTEMS

(75) Inventors: Chris Puranen, Noblesville, IN (US); Rajendra K. Shah, Indianapolis, IN (US); Eugene L. Mills, Jr., Avon, IN (US)

(73) Assignee: Carrier Corporation, Farmington, CT (US)

( * ) Notice: Subject to any disclaimer, the term of this patent is extended or adjusted under 35 U.S.C. 154(b) by 206 days.

(21) Appl. No.: 12/966,524

(22) Filed: Dec. 13, 2010

(65) Prior Publication Data

US 2011/0146651 A1 Jun. 23, 2011

Related U.S. Application Data

(60) Provisional application No. 61/285,774, filed on Dec. 11, 2009.

(51) Int. Cl.
*G05B 13/00* (2006.01)
*F24H 9/20* (2006.01)

(52) U.S. Cl.
USPC ..................... 700/276; 126/116 A

(58) Field of Classification Search
USPC .................................. 126/116, 112
See application file for complete search history.

(56) References Cited

U.S. PATENT DOCUMENTS

| | | | |
|---|---|---|---|
| 5,590,642 A * | 1/1997 | Borgeson et al. | 126/116 A |
| 6,430,985 B1 * | 8/2002 | Drees | 73/1.34 |
| 6,718,277 B2 * | 4/2004 | Sharma | 702/132 |
| 6,994,620 B2 * | 2/2006 | Mills | 454/255 |
| 7,178,350 B2 * | 2/2007 | Shah | 62/176.6 |
| 2001/0051321 A1 * | 12/2001 | La Fontaine | 431/12 |
| 2003/0059730 A1 * | 3/2003 | Sigafus et al. | 431/18 |
| 2004/0194371 A1 * | 10/2004 | Kinnis | 47/17 |
| 2005/0087616 A1 * | 4/2005 | Attridge | 236/91 D |
| 2006/0004492 A1 * | 1/2006 | Terlson et al. | 700/276 |
| 2007/0095082 A1 * | 5/2007 | Garrett et al. | 62/180 |
| 2007/0193249 A1 * | 8/2007 | Takashima et al. | 60/39.181 |
| 2007/0221225 A1 * | 9/2007 | Kutt et al. | 128/205.26 |
| 2008/0311842 A1 * | 12/2008 | Alston et al. | 454/361 |

OTHER PUBLICATIONS

Scott, Jeff, "Atmospheric Pressure," Oct. 21, 2001, Aerospaceweb. org.*

* cited by examiner

*Primary Examiner* — Sean Shechtman
(74) *Attorney, Agent, or Firm* — Miller, Matthias & Hull LLP

(57) ABSTRACT

HVAC systems and methods are shown which use volumetric air flow and static pressure calculations that correct for different air densities encountered at different altitudes. With respect to the volumetric airflow rate, the systems and methods disclosed herein adjust the calculation of airflow rate to better match the BTU content of de-rated natural gas used at higher elevations, and therefore they are usable in HVAC systems that combust natural gas. The adjusted static pressure calculations may be used in any type of HVAC system.

18 Claims, 3 Drawing Sheets

| Altitude Range (ft) | Index | Altitude Factor | |
|---|---|---|---|
| | | Non-Condensing Furnaces | Condensing Furnaces |
| 52a US & CAN 0 - 2000 | 0  54a | 1.00  56a | 1.00  58a |
| 52b US 2001 - 3000 | 1  54b | .91  56b | .95  58b |
| 52c CAN 2001 - 4500 | 2  54c | .91  56c | .95  58c |
| 52d US 3001 - 4000 | 3  54d | .87  56d | .93  58d |
| 52e US 4001 - 5000 | 4  54e | .84  56e | .91  58e |
| 52f US 5001 - 6000 | 5  54f | .80  56f | .89  58f |
| 52g US 6001 - 7000 | 6  54g | .77  56g | .87  58g |
| 52h US 7001 - 8000 | 7  54h | .73  56h | .85  58h |
| 52i US 8001 - 9000 | 8  54i | .69  56i | .83  58i |
| 52j US 9001 - 10000 | 9  54j | .66  56j | .81  58j |

US = United States    CAN = Canada

FIG. 2

ALTITUDE ADJUSTMENT FOR HEATING, VENTILATING AND AIR CONDITIONING SYSTEMS

CROSS-REFERENCE TO RELATED APPLICATION

This is a non-provisional US patent application claiming priority under 35 USC §119(e) to U.S. Provisional Patent Application Ser. No. 61/285,774 filed on Dec. 11, 2009.

BACKGROUND

1. Technical Field

The present disclosure generally relates to HVAC systems and, more particularly, to methods and apparatus for controlling air handlers used at different altitudes.

2. Description of the Related Art

Modern structures, such as office buildings, manufacturing plants, barns, and residences, often are designed and constructed so as to allow control over environmental conditions within the structures. By way of example, environmental conditions such as temperature, humidity, air purity, air flow, enthalpy (combined value of temperature and humidity), and "fresh air" ventilation can be regulated to ensure that the interior environment of a structure is as may be desired for particular occupants and equipment housed in the structure, and for processes and procedures conducted within the structure.

In practice, one typical way of regulating environmental conditions within a building or other structure is by employing one or more duct systems to deliver processed air and, often, to remove air from within the building for processing. One common example of such a system is known as a heating, ventilating, and/or air conditioning (HVAC) system. HVAC systems generally are well-known, and a typical HVAC system can include, for example, components such as conduits ("ducts" or "duct systems"), air conditioners, compressors, heating elements, heat exchangers, filters, louvers (for controlling air flow to and from the exterior environment), blower fans, and airflow hoods. Simple HVAC systems can be designed employing a number of methods, including the equal friction method, the constant velocity method, the velocity reduction method, and the static regain method.

Optimizing the efficiency of an HVAC system can be viewed in terms of optimizing at least one desired HVAC system parameter to approach or equal a desired value. Predominantly, regulation of an environment within a structure entails controlling the aerial environment of the structure's interior which, in turn, usually requires measuring (and then controlling) one or more system parameters associated with the HVAC system being used. Thus, where the parameter of interest is temperature, air temperature can first be measured by using, for example, simple thermometers, thermocouples, thermistors, resistance thermometers, and more recently, solid state devices for computerized measurements. Temperature can then be controlled by passing the air in the HVAC duct system over, through, or near, one or more heating elements (if the air is too cold), or over or near a cool, compressed fluid (if the air is too warm), until the air reaches a desired temperature.

One variable impacting the efficiency of the HVAC system is the BTU content of the fuel used in the system, which is adjusted according to the elevation at which the system is installed. The natural gas supplied to higher elevations is "de-rated" to have a lower BTU content, thereby reducing the heating capacity of the system, to match the lower density of air that can be supplied for combustion. Many HVAC systems, however, use variable speed air handlers that attempt to maintain a constant mass flow of air regardless of air density, and therefore the air handlers may be operated at excessive speeds when used at higher elevations. The increased air handler speed may generate excessive noise in the system ductwork, promote formation of condensate on the heat exchangers thereby necessitating quicker replacement, and reduce the temperature of the air leaving the heat exchangers (which may deleterious impact performance of the system).

The reduced air density at higher elevations may also affect the accuracy of static pressure measurements provided for the system. Static pressure may be useful for properly installing, and then monitoring and maintaining, HVAC systems. Static pressure can be used to optimize system operation, and also as a diagnostic measure during system installation and service. Static pressure can be widely variable from installation to installation due, in part, to varied duct system configurations and blower systems, which are designed to accommodate a range of applications.

Additionally, static pressure calculations may also be impacted by air density. During HVAC control design, the static pressure of a system may be correlated to the speed at which the air handler is operated. When the system is installed at higher elevations, the air handler will operate at higher speeds to counter the drop in air density, thereby to maintain a constant mass flow of air. Conventional calculations, therefore, will predict higher values for static pressure than those that are actually observed.

It would thus be desirable to have controller methods and apparatus that correct for higher altitude installations when designing desired air handler speed and calculating static pressure of the system.

SUMMARY OF THE DISCLOSURE

A method of controlling operation of an air handler provided in an HVAC system includes determining a standard volume airflow rate, determining a set of altitude factors associated with a set of possible elevations at which the HVAC system may be installed, and modifying the standard volume airflow rate by a selected one of the set of altitude factors to obtain an altitude adjusted volume airflow rate. The method further includes generating an air handler control signal based on the altitude adjusted volume airflow rate and communicating the air handler control signal to the air handler.

A controller for communicating an air handler control signal to an air handler of an HVAC system, the controller including a processor and a memory operatively coupled to the processor and including a stored program containing a set of altitude factors corresponding to an associated set of possible elevations at which the HVAC system may be installed. The processor is programmed to receive an elevation input based on an actual elevation of the HVAC system, identify a selected possible elevation from the set of possible elevations based on the actual elevation of the HVAC system, identify a desired altitude factor associated with the selected possible elevation, determine a standard volume airflow rate demand for the HVAC system, modify the normal airflow requirement by the desired altitude factor to obtain an altitude adjusted airflow requirement, generate an air handler control signal based on the altitude adjusted airflow requirement, and communicate the air handler control signal to the air handler.

A method for determining a static pressure drop value in a section of an HVAC system external to an air handler section of the HVAC system includes determining a standard volume airflow rate for the HVAC system, determining an air density ratio based on an elevation of the HVAC system, modifying the standard volume airflow rate by the density ratio to obtain an altitude adjusted volume airflow rate, developing a mathematical model describing the air handler system, predetermining a set of constants representing performance characteristics unique to the air handler section, and using a processor to apply the predetermined set of constants, the altitude adjusted volume airflow rate, and an operational blower speed to the mathematical model to generate the static pressure drop value.

A control system is provided for determining a static pressure drop value of air in an HVAC system having an air handler, the air handler including a blower and a motor operating at an operational blower speed. The control system includes a control element communicatively coupled to the air handler and including a processor and a memory. The processor implements a mathematical model to determine the static pressure value. The mathematical model uses a measured operational blower speed, an altitude adjusted volume airflow rate, and a predetermined set of constants. The predetermined set of constants represents performance characteristics unique to the air handler. A standard volume airflow rate is modified by a density ratio to obtain the altitude adjusted volume airflow rate, and the density ratio is based on an elevation of the HVAC system.

These are other aspects and features of the disclosure will become more apparent upon reading the following detailed description when taken in conjunction with the accompanied drawings.

BRIEF DESCRIPTION OF THE DRAWINGS

FIG. 2 is a schematic illustration of a look-up table providing altitude factors to be used by a system controller in the HVAC system of FIG. 1.

Figure 1:
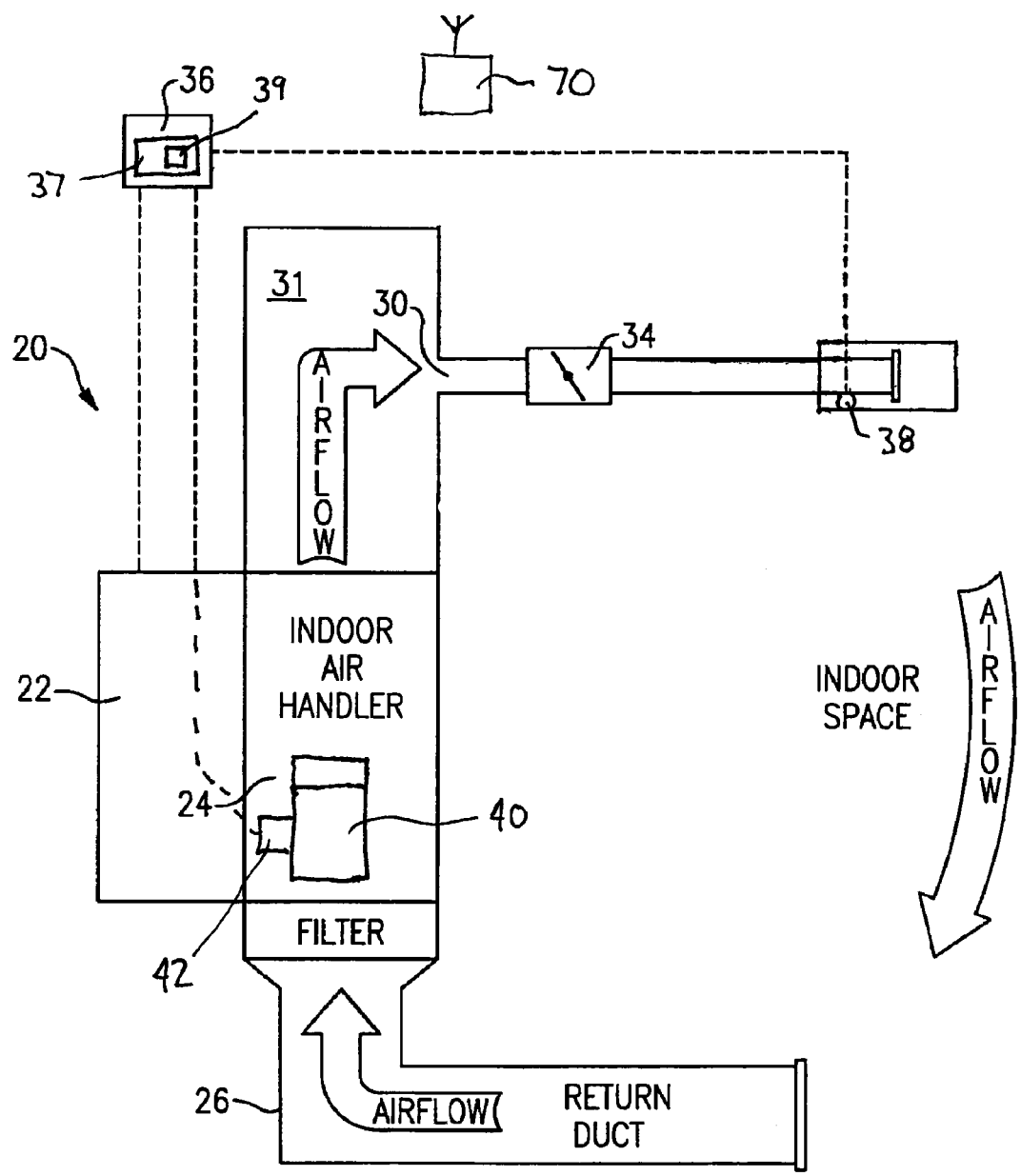
FIG. 1 is a schematic illustration of a building HVAC system.

While the present disclosure is susceptible of various modifications and alternative constructions, certain illustrative embodiments thereof will be shown and described below in detail. It should be understood, however, that there is no intention to be limited to the specific embodiments disclosed, but on the contrary, the intention is to cover all modifications, alternative constructions, and equivalents falling within the spirit and scope of the present disclosure.

DETAILED DESCRIPTION OF THE DRAWINGS

Referring now to the drawings, HVAC systems and methods are shown which use volumetric air flow and static pressure calculations that correct for different air densities encountered at different altitudes. With respect to the volumetric airflow rate, the systems and methods disclosed herein adjust the calculation of airflow rate to better match the BTU content of de-rated natural gas used at higher elevations, and therefore they are usable in HVAC systems that combust natural gas. The adjusted static pressure calculations, however, may be used in furnaces, heat pumps, or any other known type of HVAC system.

FIG. 1 schematically illustrates an HVAC system 20 installed at an elevation. As used herein, the terms "elevation" and "altitude" are generally interchangeable and refer to the distance above sea level at which something is positioned. Elevation and altitude are typically given in feet, however other units of length may be used. Accordingly, elevation and altitude of the HVAC system 20 may be expressed as a given number of feet above sea level at which the system is located.

The HVAC system 20 includes a temperature changing component 22 which communicates with an indoor air handler 24. The temperature changing component 22 changes the condition of air and typically includes an indoor unit such as a furnace or heater coil. A plenum 31 fluidly communicates with an outlet of the air handler 24. A supply duct 30 extends from the plenum 31 and has a damper 34 disposed therein.

A system control 36 may be provided to control operation of the HVAC system 20. The system control 36 may include a processor 37 having access to a memory 39. A zone control, such as a thermostat 38, may also be provided that is operatively coupled to the system control 36. The thermostat 38 may allow a user to set desired temperatures, airflows etc. for a zone associated therewith. The thermostat 38 may therefore include a temperature sensor for providing an actual temperature back to the system control 36. The system control 36 operates the damper 34, the temperature changing component 22, and the indoor air handler 24 and also communicates with thermostat 38. As a user inputs desired temperatures and airflows etc. at thermostat 38, the data is communicated to the system control 36 which recognizes the user selected criterion and communicates with the temperature changing component 22 to change the condition of the air provided by the indoor air handler 24 accordingly. The indoor air handler 24 may communicate the air from a return ducts 26, condition the air, and drive the conditioned air into the plenum 31. From the plenum 31, the air enters the supply duct 30.

The flow of conditioned air communicated to the interior space is controlled by the position of the damper 34 located within the supply duct 30. The damper 34 may be selectively opened or closed to restrict or allow additional airflow. Preferably, the damper 34 may be positioned at incremental positions between the fully open and the fully closed positions. Once air enters and circulates within the indoor space, it enters the return duct 26 where it is filtered and communicated again through the indoor air handler 24 as demanded by the system control 36.

The air handler 24 may include a blower 40 having a variable speed motor 42 operatively coupled thereto. The motor 42 may be any known type of variable speed motor, including an electronically commutated motor (ECM). The system control 36 communicates an air handler control signal to the air handler 24 which operates the motor 42 at a desired speed (RPM) to produce the desired volume airflow rate. A desired motor speed (and therefore a desired volume airflow rate) may be associated with a specific operating parameter, such as the differential between actual and desired room temperature.

A table of volume airflow rates/motor speeds and associated air handler control signals may be predetermined and stored in the memory 39. The volume airflow rates may be based on standard conditions, and therefore would be standard volume air flow rates for the HVAC system.

As noted above, the BTU content of the natural gas supplied to the system may be reduced to achieve proper combustion with the lower density air present at higher altitudes. Accordingly, without correction, the system control 36 will operate the air handler 24 at higher speeds to increase the volume of lower density air, thereby to maintain a constant air mass flow through the system. The increased volume airflow rate, however, may substantially exceed the amount of air needed for a system operating at a de-rated capacity.

An altitude factor may be used to correct for the excessive volume airflow rates obtained using standard controller design. The altitude factor is applied to the standard volume airflow rate to obtain an altitude adjusted volume airflow rate. The air handler signal may be based on the altitude adjusted volume airflow rate and communicated to the air handler 24.

In one embodiment, the altitude factor may be selected from a set of predetermined altitude factors associated with a set of possible altitude ranges at which the HVAC system 20 may be located. As best shown in the chart 50 provided at FIG. 2, a plurality of possible altitude ranges 52a-j may be identified. In some cases, the altitude range may be geographically specific to account for different gas de-rating standards in different territories. For example, a first possible altitude range 52a may be 0-2000 feet in either the U.S. or Canada. A second possible altitude range 52b may be 2001-3000 feet in the U.S. only. A third possible altitude range 52c may be 2001-4500 feet in Canada only. A fourth possible altitude range 52d may be 3001-4000 feet in the U.S., and so on as shown in FIG. 2.

An altitude factor may be associated with each possible altitude range 52a-j. The altitude factor may further be dependent on the type of furnace used in the HVAC system. For example, for a given altitude range, a different altitude factor may be used for a non-condensing furnace than for a condensing furnace. FIG. 2 illustrates a set of non-condensing furnace altitude factors 56a-j and a set of condensing furnace altitude factors 58a-j. For example, the value of non-condensing furnace altitude factor 56c is 0.91, which is associated with altitude range 52c corresponding to an elevation of 2001-4500 feet in Canada. As a further example, the value of condensing furnace altitude factor 58e is 0.91, which is associated with altitude range 52e corresponding to an elevation of 4001-5000 feet in the U.S.

To facilitate adjustment of the system control 36, a set of altitude index numbers 54a-j may further be stored in the memory 39 that are associated with specific altitude ranges 52a-j. In the exemplary embodiment, each altitude index number 54a-j is a single digit to facilitate input into the system control 36. For example, altitude index number 54d is the number "3", which may be associated with altitude range 52d of 3001-4000 feet in the U.S. Information regarding the elevation of the HVAC system 20 may be provided to the system control 36 using a variety of different input means. For example, elevation information may be input via the thermostat 38, a remote unit 70 that is directly or indirectly communicatively coupled to the system control 36, manually entered by a user, automatically sensed, or by other means.

The altitude factor is used to modify the standard volume airflow rate calculated for the system to obtain the altitude adjusted volume airflow rate. More specifically, the standard volume airflow rate is multiplied by the altitude factor corresponding to the appropriate altitude range. At elevations above 2001 feet, the altitude factor is always less than one, and therefore the altitude adjusted volume airflow rate at and above this elevation will be less than the standard volume airflow rate.

Figure 3:
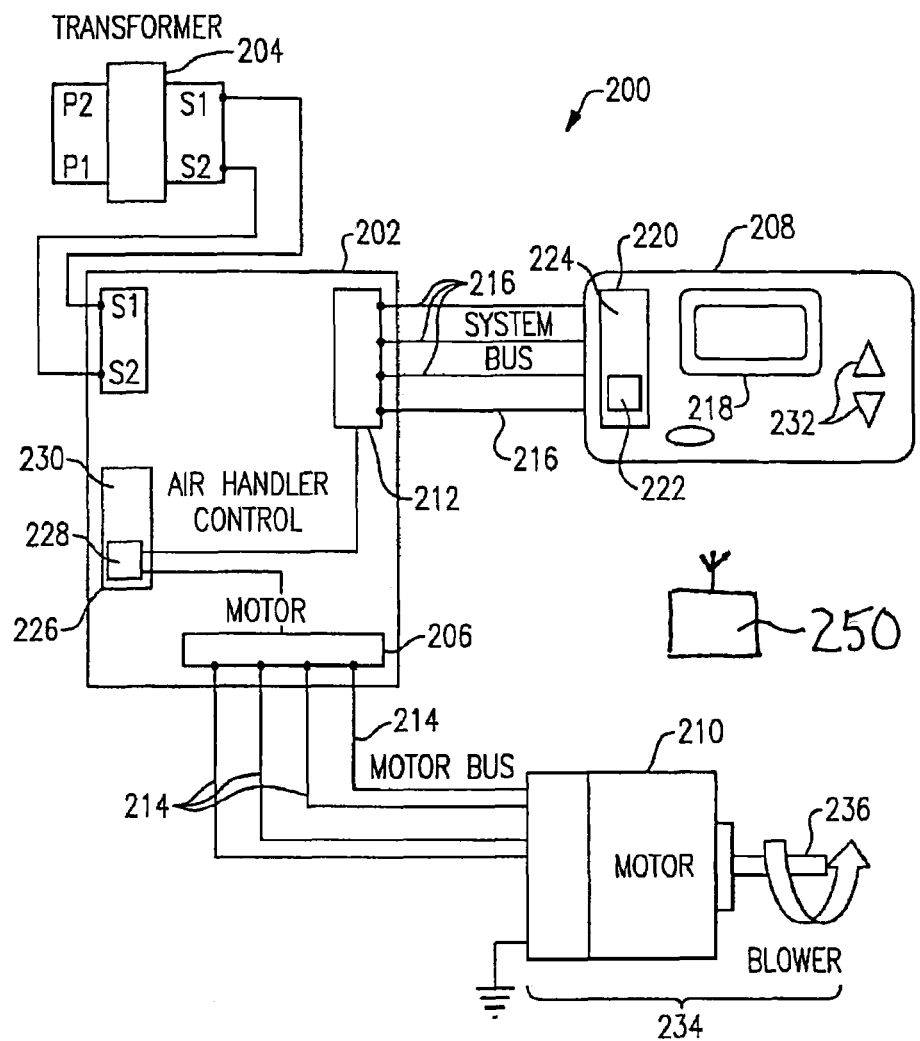
FIG. 3 is a component diagram of an alternative embodiment of an HVAC system.

An alternative embodiment of an HVAC system 200 is illustrated in FIG. 3 that provides for altitude correction of static pressure calculations. The HVAC system 200 may include an air handler control 202, a system control element 208, and a blower system 234 which includes a motor 210 and a blower 236. The system control element 208 is shown in direct communication with the air handler control 202, and the air handler control 202 is shown in direct communication with the motor 210 of the blower system 234. Optionally, the HVAC system 200 can include a transformer 204, for ensuring that proper voltage is applied to the HVAC system 200.

In the illustrative embodiment, the air handler control 202 includes an air handler controller 226, which includes a processor 228 and a memory 230 for storing certain operational characteristics particular to the given HVAC system 200, which will be described in greater detail later. As shown, the air handler controller 226 can be in communication with a model control and feedback circuit 212 and with a motor control and feedback circuit 206. Circuit 212 serves to connect the air handler control 202 to the system control element 208 by means of a system bus 216, and allows signals to be communicated between the air handler control 202 and the system control element 208. Circuit 206 connects the air handler control 202 to the motor 210, and serves to transmit commands to, and receive operation feedback from, the motor 210 by means of a motor bus 214.

The blower system includes a motor 210, which has an operational motor torque, and a blower 236, which has a blower diameter and an operational blower speed. The motor 210 serves to impel blades or other means of the blower 236 (not shown) to move air through the duct system (not illustrated) associated with HVAC system 200. The motor 210 preferably is a variable speed motor, of the type sold by Carrier Corporation of Farmington, Conn., in connection with its variable speed furnaces. The motor 210 receives operation requests in the form of an operating airflow volume over the motor bus 214 from the air handler control 202, and reports back its operating speed via the motor bus 214 to the air handler control 202.

The system control element 208 includes a computing element 220. The Computing element 220 includes a microprocessor 222 and a memory 224, and may be, for example, a computer, a personal digital assistant (PDA), an electronic thermostat, or any other device with the capability of storing and reading input data, performing calculations, and reporting the results of calculations. The system control element 208 preferably has a user interface element 218, such as a graphic user interface (GUI), a CRT display, a LCD display, or other means by which a user of the HVAC system 200 can be apprised of system status and/or particular characteristics of the system (such as static pressure). The system control element 208 also optionally has a user input element 232, such as a keypad, keyboard, or other data input means, which allows a user of the HVAC system 200 to change the operation of the HVAC system 200.

In the illustrative embodiment, static pressure drop in a section of the HVAC system 200 external to the air handler section is determined by the system control element 208, though the determination of static pressure could be performed at any number of locations in the HVAC system 200, such as at the air handler control 202. In order for system control element 208 to determine static pressure in the illustrative embodiment shown, system control element first receives a value for system volume airflow rate (of air flowing through the HVAC system 200) and values for blower diameter and blower speed from the air handler control 202 over the system bus 216. The values for system volume airflow rate, blower diameter, and blower speed could be stored in the memory 224 of the system control element 208 long before calculation, though for greatest accuracy, it is preferred that these values, especially for system volume airflow rate and blower speed, are received at the system control element 208 from the air handler control 202 contemporaneously, or nearly contemporaneously, with the determination of static pressure by the system control element 208.

A method of calculating static pressure may use performance parameters for fan systems (though other parameters could be employed, such as motor torque and blower speed, either calculated or obtained from look-up tables). These parameters are used to predict fan and blower performance, and form the basis for the widely accepted "fan laws". The parameters used may be the Flow Coefficient, Pressure Coefficient, and Power Coefficient identified in U.S. Pat. No. 6,994,620, which is incorporated by reference herein. The pressure coefficient plotted against the flow coefficient describes the blower pressure performance, and can be used to predict the static pressure developed at any operating condition of N revolutions per minute (rpm), Q cubic feet per minute (cfm), and air density (lb/ft$^3$). The power coefficient is not believed to affect this model and is neglected from this point forward.

The flow-pressure relationship is determined using airflow performance tables (describing N, Q, and power vs. static pressure) which are experimentally measured for any given HVAC installation using, for example, the procedures and apparatus described in ASHRAE (American Society of Heating, Refrigerating, and Air-Conditioning Engineers, Inc.) Standard 37-1988, Methods of Testing for Rating Unitary Air-Conditioning and Heat Pump Equipment (ANSI approved), the disclosure of which is incorporated by reference herein. The flow and pressure coefficients may be calculated using known equations, and the pressure coefficient may be regressed against the flow coefficient. The calculation of these constants can be pre-determined for any particular HVAC system with an air handler.

A universal mathematical model may be used to describe any air handler system. Solving for the static pressure term provides the model:

$$P_s = K_3 * Q_a^3/N + K_2 * Q_a^2 + K_1 * Q_a * N + K_0 * N^2$$

where $P_s$ is the static pressure, $Q_a$ is the altitude adjusted volume airflow rate, N is the operational blower speed, and $K_3$, $K_2$, $K_1$, and $K_0$ are the predetermined constants.

A standard volume airflow rate for the HVAC system may be modified by an air density ratio to provide more accurate static pressure calculations. More specifically, the density ratio may be based on a pressure ratio that is determined by the following equation:

$$P_r = (1.0 - (E/145442))^{5.25587 6},$$

where $P_r$ is the pressure ratio and E is the elevation of the HVAC system in feet above sea level. Using the pressure ratio, an atmospheric pressure may then be calculated using the following equation:

$$P_a = (29.921 * P_r),$$

where $P_a$ is the atmospheric pressure and $P_r$ is the pressure ratio calculated above. Next, the density ratio may be calculated using the following equation:

$$\rho_r = P_a/(0.05655 * T),$$

where $\rho_r$ is the density ratio and T is temperature (in degrees Rankin). Combining the steps noted above, therefore, the density ratio may be expressed as:

$$\rho_r = \{[(1.0-(E/145442))^{5.25587 6}] * 29.921\}/(0.05655 * T),$$

where $\rho_r$ is the density ratio, E is the elevation of the HVAC system (in feet above sea level), and T is temperature (in degrees Rankin).

The density ratio may be used to modify the standard volume airflow rate to obtain the altitude adjusted volume airflow rate. More specifically, the altitude adjusted volume airflow rate may be calculated using the following equation:

$$Q_a = Q_s/\rho_r,$$

where $Q_a$ is the altitude adjusted volume airflow rate, $Q_s$ is the standard volume airflow rate, and $\rho_r$ is the density ratio. The altitude adjusted volume airflow rate $Q_a$ may then be used in the mathematical model to calculate a static pressure value that is more accurate at higher altitudes.

In operation, this model is stored as a series of instructions in memory 224, and used by the processor 222 in the system control element 208 to calculate $P_s$. As described above, the preferred model uses the four stored system pressure constants ($k_3$, $k_2$, $k_1$, $k_0$) for each model produced. In the illustrative embodiment, the four system pressure constants are stored in the memory 230 of the air handler controller 226. The system control element 208 calculates the static pressure $P_s$, and optionally displays the calculated pressure on the user interface element 218.

Information regarding the elevation of the HVAC system 200 may be provided to the air handler control 202 using a variety of different input means. For example, elevation information may be input via the thermostat 208, a remote unit 250 that is directly or indirectly communicatively coupled to the air handler control 202, manually entered by a user, automatically sensed, or by other means.

It is to be understood that while the foregoing description has been given with reference to particular types of HVAC systems, such as HVAC systems having a furnace, the teachings of this disclosure can be used in conjunction with other types of HVAC systems known to those of ordinary skill in the art having volume airflows that may be impacted by the elevation at which the system is installed.

It will be apparent to those skilled in the art that various modifications and variations can be made in the disclosed HVAC systems and methods without departing from the scope of the disclosure. Embodiments other than those specifically disclosed herein will be apparent to those skilled in the art from consideration of the specification and practice of the systems and methods disclosed herein. It is intended that the specification and examples be considered as exemplary only, with a true scope of the disclosure being indicated by the following claims and their equivalents.

What is claimed is:

1. A method of controlling operation of an air handler provided in an HVAC system, comprising:
   determining a standard volume airflow rate corresponding to a volume of air flowing through the HVAC system before altitude correction, the volume of air based upon possible elevations at which the HVAC system is installed;
   determining a set of altitude factors associated with a set of the possible elevations at which the HVAC system is installed, the set of altitude factors selected based on at least one of a BTU content of natural gas used in the HVAC system and a furnace type, the set of altitude factors being less than one for elevations above two thousand feet;
   modifying the standard volume airflow rate by a selected one of the set of altitude factors to obtain an altitude adjusted volume airflow rate, the adjusted volume airflow rate obtained by multiplying the standard volume airflow rate by the selected one of the set of altitude factors;
   generating an air handler control signal based on the altitude adjusted volume airflow rate; and
   communicating the air handler control signal to the air handler.

2. The method of claim 1, in which the furnace type is one of a condensing furnace and a non-condensing furnace.

3. The method of claim 1, further comprising, after determining the set of altitude factors, selecting a desired altitude factor from the set of altitude factors based on an actual elevation at which the HVAC system is installed.

4. The method of claim 3, in which selecting the desired altitude factor is manually performed by a user.

5. The method of claim 3, in which an index number is provided for each elevation of the set of possible elevations, and in which selecting the desired altitude factor comprises selecting a desired index number associated with an actual elevation at which the HVAC system is installed.

6. The method of claim 3, in which selecting the desired altitude factor is performed using a thermostat.

7. The method of claim 3, in which selecting the desired altitude factor is performed using a remote unit.

8. The method of claim 1, further comprising providing a controller for communicating with the HVAC system, the controller comprising (a) a processor; and (b) a memory operatively coupled to the processor and including a stored program containing the set of altitude factors associated with the set of possible elevations at which the HVAC system may be installed.

9. A method for determining a static pressure drop value in a section of an HVAC system external to an air handler section of the HVAC system, the method comprising:
    determining a standard volume airflow rate for the HVAC system corresponding to a volume of air flowing through the HVAC system before altitude correction, the volume of air based upon an elevation at which the HVAC system is installed;
    determining an air density ratio based on a the elevation of the HVAC system;
    dividing the standard volume airflow rate by the air density ratio to obtain an altitude adjusted volume airflow rate;
    developing a mathematical model describing the HVAC system;
    predetermining a set of constants representing performance characteristics unique to the air handler section; and
    using a processor to apply the set of constants, the altitude adjusted volume airflow rate, and an operational blower speed to the mathematical model to generate the static pressure drop value.

10. The method of claim 9, in which the air density ratio is determined by the following equation:

$$\rho_r = \{[(1.0-(E/145442))^{5.255876}]*29.921\}/(0.05655*T)$$

where $\rho_r$ is the air density ratio, E is the elevation of the HVAC system (in feet above sea level), and T is temperature (in degrees Rankin).

11. The method of claim 10, wherein determining the air density ratio comprises calculating a pressure ratio.

12. The method of claim 11, in which the static pressure drop value is determined by the following equation:

$$P_s = K_3*Q_a^3/N + K_2*Q_a^2 + K_1*Q_a*N + K_0*N^2$$

where $P_s$ is the static pressure drop value, $Q_a$ is the altitude adjusted volume airflow rate, N is the operational blower speed, and $K_3$, $K_2$, $K_1$, and $K_0$ are the set of constants.

13. The method of claim 9, in which determining the air density ratio comprises inputting the elevation of the HVAC system using a thermostat.

14. The method of claim 9, in which determining the air density ratio comprises inputting the elevation of the HVAC system using a remote unit.

15. A control system for determining a static pressure drop value of air in an HVAC system having an air handler, the air handler including a blower and a motor operating at an operational blower speed, the control system comprising:
    a control element communicatively coupled to the air handler and including a processor and a memory;
    wherein the processor implements a mathematical model to determine the static pressure drop value; wherein the mathematical model uses a measured operational blower speed, an altitude adjusted volume airflow rate, and a set of constants;
    wherein the set of constants represent performance characteristics unique to the air handler;
    wherein a standard volume airflow rate is divided by an air density ratio to obtain the altitude adjusted volume airflow rate, the standard volume airflow rate corresponding to a volume of air flowing through the HVAC system before altitude correction, the volume of air based upon an elevation at which the HVAC system is installed; and
    wherein the air density ratio is based on the elevation of the HVAC system.

16. The control system of claim 15, in which the air density ratio is determined by the following equation:

$$\rho_r = \{[(1.0-(E/145442))^{5.255876}]*29.921\}/(0.05655*T)$$

where $\rho_r$ is the air density ratio, E is an elevation of the HVAC system (in feet above sea level), and T is temperature (in degrees Rankin).

17. The control system of claim 15, four of the set of constants are used, each of the constants being pre-determined.

18. The control system of claim 17, in which the static pressure drop value is determined by the following equation:

$$P_s = K_3*Q_a^3/N + K_2*Q_a^2 + K_1*Q_a*N + K_0*N^2$$

where $P_s$ is the static pressure drop value, $Q_a$ is the altitude adjusted volume airflow rate, N is the measured operational blower speed, and $K_3$, $K_2$, $K_1$, and $K_0$ are the set of constants.

* * * * *